No. 639,038.  
A. HEINEMANN.  
PRESERVE JAR.  
(Application filed Aug. 18, 1899.)  
Patented Dec. 12, 1899.

(No Model.)

WITNESSES:  
Ella L. Giles

INVENTOR  
Albert Heinemann  
BY  
Richards  
ATTORNEYS

THE NORRIS PETERS CO., PHOTO-LITHO., WASHINGTON, D. C.

UNITED STATES PATENT OFFICE.

ALBERT HEINEMANN, OF BERLIN, GERMANY.

PRESERVE-JAR.

SPECIFICATION forming part of Letters Patent No. 639,038, dated December 12, 1899.

Application filed August 18, 1899. Serial No. 727,695. (No model.)

*To all whom it may concern:*

Be it known that I, ALBERT HEINEMANN, of Berlin, in the Empire of Germany, have invented a new and useful Improvement in Preserve-Jars; and I do hereby declare the following to be a full, clear, and exact description thereof, reference being had to the accompanying drawings, forming a part of this specification, This invention relates to a jar or like receptacle which is preferably to be used for packing up preserves or the like. It is specially adapted for hermetically closing up such stuffs, liquors, &c., where fixed lids closed by soldering cannot be employed on account of the injury that would be done to the contents of the jar.

The jar or receptacle according to the present invention is preferably made of stoneware, porcelain, or the like, which material is not attacked by the substances destined to be kept in the jar. It can be hermetically closed, and, furthermore, when the jar is open the lid can be fixed and supported so as to stand upright by a very simple device, so that the lid is not in the way when the jar is to be filled or emptied. Besides, all parts of the attachment can be readily removed in case the jar should be broken or to allow the same being thoroughly cleaned.

Figure 1:
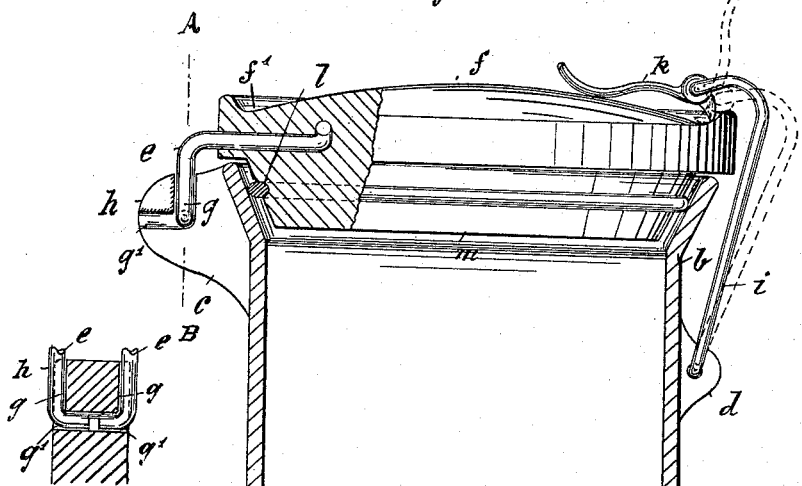
Figure 2:
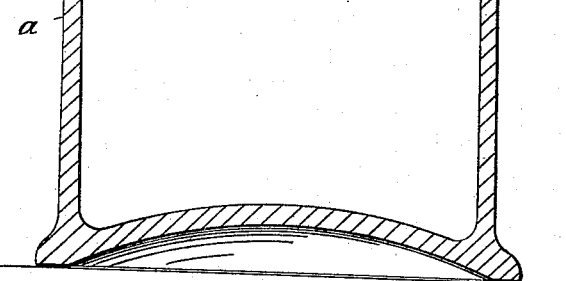

Referring to the accompanying drawings, Figure 1 shows the jar in part vertical section, and Fig. 2 is a vertical section on line A B of Fig. 1.

The jar $a$ is furnished with a conically-formed neck $b$ and carries on its sides, preferably integral with the jar and diametrically opposite to each other, two lugs $c$ and $d$. The lug $c$ is provided with a bore, wherein a spring-bow $e$, of metallic wire, is inserted, destined to support the lid when the lid is open. The other end of the bow $e$ is fixed in the lid $f$, so that the bow acts like a hinge. The lug $c$ has also two grooves $g$ and $g'$, which are disposed at right angles to each other. The bow $e$ rests in one of the grooves $g$ when the lid is closed, whereas on opening the jar by swinging around the lid the ends of the bow $e$ are moved over the thicker part $h$ of the lug $c$, whereby the ends are spread open. As soon as the lid stands vertical the ends of the bow engage into the groove $g'$, thereby keeping and supporting the lid in a vertical position. The second lug $d$, also provided with a bore, receives the locking-bow $i$, to which is fastened a double-armed lever $k$, turning in the locking-bow. The top of the lid has a groove $f'$ in front or all around same for receiving the nose of the locking-lever when the lid is to be closed and the lever on being tilted over secures the latter. On releasing the lever the bow and lever take up the position shown by the dotted lines in Fig. 1.

The lid $f$ tapers toward its lower side, so as to fit nicely into the conical neck of the jar. The periphery of the lid $f$ is provided with a groove for receiving a packing-ring $l$, of india-rubber or other suitable material. On pressing down the lid by means of the locking bow and lever its whole surface bears against the lid, and thus closes the jar hermetically, preventing atmospheric air gaining access to the contents of the jar.

What I claim as my invention, and desire to secure by Letters Patent, is—

1. The combination with a jar and lid, of a lug carried by said lid intersecting grooves in said lug, an angular spring member carried by said lid having its ends pivoted at the point of intersection of said grooves and adapted to have its portion above said end rest in the grooves, substantially as described.

2. The combination with a jar and lid, of a lug extending laterally from the jar, right-angularly-disposed intersecting grooves in the sides of said lug, and a double-spring member fixed in the lid having its legs arranged on opposite sides of said lug and adapted to rest in the grooves therein, the ends of said legs being bent inwardly and having a pivotal engagement with the lug at the point of intersection of said grooves, substantially as described.

In witness whereof I have hereunto set my hand in presence of two witnesses.

ALBERT HEINEMANN.

Witnesses:
 HENRY HASPER,
 WILLIAM MAYNER.